United States Patent [19]

Rice et al.

[11] 4,189,294
[45] Feb. 19, 1980

[54] FLAMELESS COMBUSTION BURNER AND METHOD OF OPERATION

[75] Inventors: Richard E. Rice, Arlington; Charles W. Peterson, Stoughton, both of Mass.

[73] Assignee: Comstock & Wescott Inc., Cambridge, Mass.

[21] Appl. No.: 843,434

[22] Filed: Oct. 18, 1977

[51] Int. Cl.² .......................................... F23D 13/14
[52] U.S. Cl. ..................... 431/7; 126/39 J; 431/329
[58] Field of Search .............. 431/7, 170, 328, 329; 126/39 J

[56] References Cited

U.S. PATENT DOCUMENTS

| | | | |
|---|---|---|---|
| 1,431,633 | 10/1922 | Clemens | 431/354 |
| 3,199,505 | 8/1965 | Lloyd | 431/328 |
| 3,421,859 | 1/1969 | Kruggel | 431/328 |
| 3,810,732 | 5/1974 | Koch | 431/328 |
| 4,047,876 | 9/1977 | Rice | 431/7 |

Primary Examiner—Carroll B. Dority, Jr.
Attorney, Agent, or Firm—James H. Grover

[57] ABSTRACT

A flameless combustion burner and method for operating the device. The burner includes an ignition zone with a starting device, a catalyst zone, and a plenum. To obtain flameless combustion, a fuel and a combustion supporting gas is introduced into the ignition zone from the plenum and a flame is initiated by means of the starting device. The products of combustion flow over the catalyst to heat it to a temperature where it can initiate flameless combustion. Then the flow of either the fuel or the combustion supporting gas or both is momentarily stopped and the flame is extinguished. The flow is then resumed while the catalyst is still hot and flameless combustion will start in the catalyst zone. The products of combustion are withdrawn from the catalyst zone and the heat is utilized in the burner.

18 Claims, 3 Drawing Figures

FLAMELESS COMBUSTION BURNER AND METHOD OF OPERATION

BACKGROUND OF THE INVENTION

This invention relates to burners and particularly to those which utilize a catalyst for flameless combustion. Such burners can operate with a large number of fuels and under a wide variety of environmental conditions to provide a very high heating intensity. The combustion products of these devices contain lesser amounts of substances such as carbon monoxide than open flame burners and hence are less toxic and more pollution free.

STATEMENT OF THE INVENTION

According to our invention we have divised a catalytic burner and a method of operating it. The burner that we have invented includes at least two zones and a plenum. One zone contains the catalyst and the other, an ignition zone, contains a starter means. The ignition zone is disposed downstream from the catalyst zone and is arranged in fluid flow relation with the plenum that receives mixes and distributes the materials for combustion. The catalyst zone, the ignition zone and the plenum are each separated from the other by foraminous members. Means are provided in conjunction with the plenum to interrupt the flow of the fuel or the combustion supporting gas, or both, into the ignition zone.

To operate the burner according to our invention, the fuel and combustion supporting gases are introduced into the plenum and in turn, passed into the ignition zone through a foraminous member. Flame combustion is initiated in the ignition zone and maintained for a sufficient time for the hot combustion gases to pass through another foraminous member and heat the catalyst to a temperature which will support flameless combustion. Then the flow of either the fuel or the combustion supporting gas or both is interrupted momentarily and the flame is extinguished. The flow is then resumed and flameless combustion will begin on the hot catalyst. The products of combustion flow out of the catalyst zone and provide the heat that is required.

We have found that it is important to separate the catalyst zone from the ignition zone by a foraminous member, preferably a screen with openings between about 0.075 and 0.028 inches. Likewise, it is important to separate the plenum and the ignition zone with another foraminous member, again preferably a screen with openings between about 0.075 and 0.028 inches. In the former case, the foraminous member provides for efficient distribution of the gas and prevents the catalyst from entering the ignition zone and in the latter case, the member prevents the flame from entering the plenum which might cause preignition and possible explosion.

Flame combustion in the ignition zone can be initiated in a number of ways. One of the more reliable approaches is to connect an incandescible source to a power supply. The source reaches a red heat quickly and a flame will be produces when combustible materials are passed over it. When the flow of such materials is interrupted, the current to the source can be stopped and, as the gas is introduced again, flameless combustion on the catalyst will start and be sustained. Another approach can be the use of a spark igniter which is attached to a high voltage source. Most preferably we use the discharge of a piezoelectric spark between a pair of electrodes for the ignition. Such discharges do not require auxiliary power supplies which can be highly advantageous when the burner is used as a camp stove.

DRAWINGS

DESCRIPTION

Figure 1:
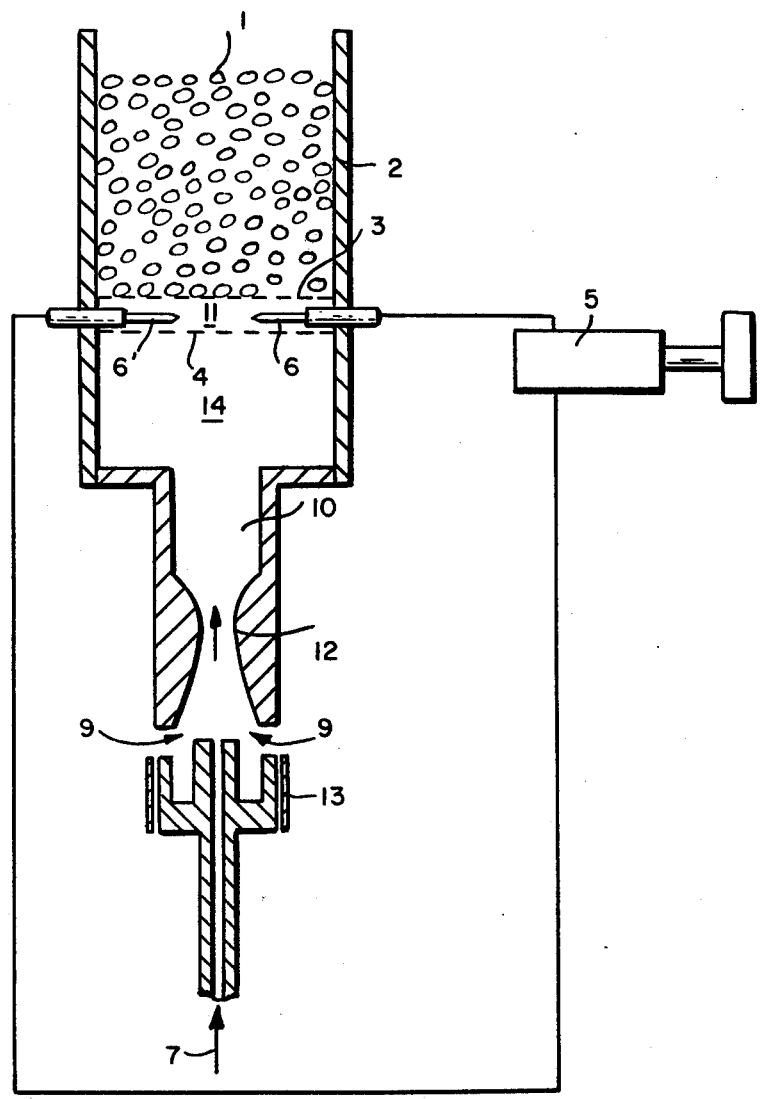
FIG. 1 is a cross sectional view of one embodiment of the invention in which the catalyst can be maintained in a static or fluidized bed.

Referring now to the burner shown in FIG. 1, a bed of pellets is disposed in a cylindrical container 2 and is supported upon a metallic screen 3. The portion of the burner which confines the pellets constitutes the catalyst zone and combustible materials and combustion supporting gasses enter the zone through the distribution screen 3. In the preferred embodiment of this construction, the gasses and materials flow upwardly through the pellets in an even stream throughout the horizontal cross section of the bed 1. When the gasses are injected into the bed with sufficient pressure and flow rate, individual pellets are disengaged from each other and become suspended to form a fluidized bed which takes on many of the characteristics and appearances of a boiling liquid. When the entire bed 1 is in the fluidized state, the injected gases spread uniformly throughout the volume of the bed 1 with relatively uniform distribution and by maintaining the bed temperature above the ignition temperature of the fuel, the catalytic reaction of the fuel and combustion supporting gases will occur uniformly and complete combustion will be produced, leaving substantially no carbon monoxide.

An ignition screen 4 is disposed a short distance beneath the distribution screen 3 and the two screens 3 and 4 cooperate to define the ignition zone 11. A piezoelectric spark generator 5 is connected to two electrodes 6 and 6' which are disposed in the ignition zone 11. When the piezoelectric generator is activated, a spark jumps between the electrodes 6 and 6'.

Ignition screen 4 separates the ignition zone 11 from a plenum 14 that is disposed therebeneath. Fuel is admitted to the plenum 14 through conduit 7 and the flow rate is controlled by a valve or pressure regulator (not shown). The fuel conduit 7 communicates with orifices 9 and entrains air which enters there through orifices 9. The mixture of fuel and combustion supporting gas then flows through the throat of an aspirator 12, into the plenum 14 and thence into ignition zone 11 to the catalyst zone. Preferably the flow of combustion supporting gas is controlled by a sleeve 13 which is slidably disposed about tube 7 and is movable to cover and uncover the air intake orifices 9.

In operation of the burner, a two stage series is used. To start the burner, a fuel is introduced through conduit 7 at a fairly low rate, with sufficient air to completely burn the fuel in the ignition space without the production of carbon monoxide, or other products of incomplete combustion. In general, in order to keep the space of the ignition zone relatively small, the flow rate is less during the starting cycle than during the combustion cycle. The fuel entrains air which enters through orifices 9 and the gases pass through aspirator 12 which insures mixing. From the aspirator 12, the mixture enters the plenum 14 and passes through ignition screen 4 into ignition zone 11. A spark is initiated between electrodes 6 and 6' and a flame will form. The combustion products of the flame flow into the catalyst zone and heat at least a portion of the catalyst bed 1 to a temperature above about 350° F. in a few seconds. Such temperature will support spontaneous flameless combustion within the catalyst bed. The flame in ignition zone 11 is then extinguished by momentarily stopping the flow of fuel through conduit 7 or combustion supporting gas through orifices 9. The bed will be sufficiently hot to start the flameless combustion cycle in the catalyst bed 1 when the flow is reintroduced. When the flameless combustion starts, the flow rate is adjusted to a rate which completely burns the fuel and which is sufficient to fluidize the bed but insufficient to entrain the particles and blow them from the burner. Of course if the fluidized bed operation is not desired, the flow rate can be maintained at a level which will not produce this condition. We have found that a preferred rate is one which produces a heating intensity in the catalyst bed of at least approximately $1.6 \times 10^6$ BTU per hour per cubic foot of catalyst in the unfluidized state.

The flame that is produced during the first stage of operating our burner is confined to the ignition zone 14 by screens 3 and 4. They prevent the flame from entering the aspirator 12 or the mouth of the conduit 7. The size of the ignition zone 11 is not critical so long as it is large enough to allow for spark generation and to provide for a sufficient volume of flame to heat the catalyst. The quantity of catalyst disposed in the catalyst zone also is not critical so long as there are sufficient quantities to promote complete combustion of the fuel that is introduced.

As a further example of operating the burner of FIG. 1, the catalyst 1 was in the form of spheres of highly porous gamma alumina approximately $\frac{1}{8}"$ in diameter containing on their surfaces an average of approximately 0.1% by weight of catalytic platinum black. The catalyst zone had an inside diameter $1\frac{5}{8}"$ and the depth of the catalyst bed 1 was $1\frac{1}{2}"$. The screens 3 and 4 were stainless steel rectilinear wire mesh with wire diameter of 0.025" and wire spacing center-to-center of 0.050". The fuel orifice had a diameter of 0.007". Flame combustion in the ignition zone 11 was initiated by a commercial piezoelectric igniter, with propane entering conduit 7 at a pressure of 10 psig. After a few seconds of flaming, the combustion in the ignition zone 11 was extinguished by sliding sleeve 13 over orifices 9, thereby closing them.

Sleeve 13 was slipped back and orifices 9 were opened. The air reentered and the fuel-air mixture burned flamelessly on the surface of the catalyst pellets. The hot products of combustion left from the top of the catalyst bed to provide heat.

Figure 2:
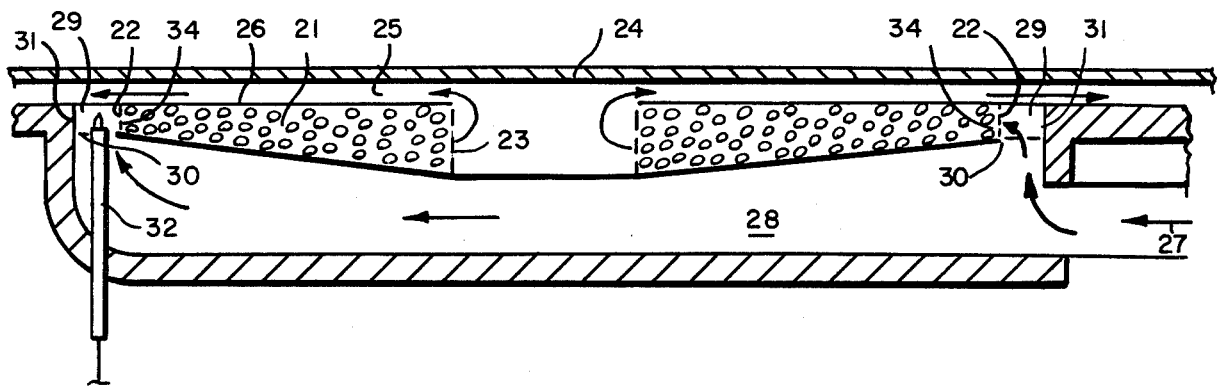
FIG. 2 is a cross sectional view of another embodiment of the invention which can be used for a stove burner and the gasses pass from the periphery of the catalyst zone into the center.

The ignition method described above can be applied to advantage in the design of a stove burner as illustrated in FIG. 2. The catalyst zone 21 is in the form of an annular body which has a screen 22 covering the opening through which the fuel-air mixture enters, and an exit screen 23 through which the combustion products leave. The bottom surface 24 of a cooking utensil can be located above the upper surface 26 of the catalyst zone 21 or alternatively, a plate (not shown) can be disposed therebetween. The combustion products move radially outward through the space 25 between the upper surface 26 of the catalyst zone and the surface 24. This configuration provides for effective heat transfer between the upper surface 26 of the catalyst zone and the surface 24 both by radiation from the hot combustion products passing through the space 25. A mixture of air and fuel enters through tube 27 into plenum 28 which can be formed of insulation material. The gases then flow into an annularly disposed ring 29 bounded by the ignition screen 22, distribution screen 30, the upper surface 26, and side surface 31, which together define the ignition zone 29. A piezo electrode 32 produces a spark in the ignition zone 29 to ignite the air-fuel mixture when a low flow of fuel is provided. By momentarily interrupting the flow of combustion air and/or fuel, the combustion is extinguished and thereafter flamelessly occurs in the catalyst bed when the flow is reintroduced.

Optionally an annular ring of non-catalytic material such as inert pellets or steel wool can be disposed about the catalyst bed 21 immediately inside of ignition screen 22 to prevent overheating of screen 22 and accidental backfiring into ignition zone 29 or plenum 28.

Figure 3:
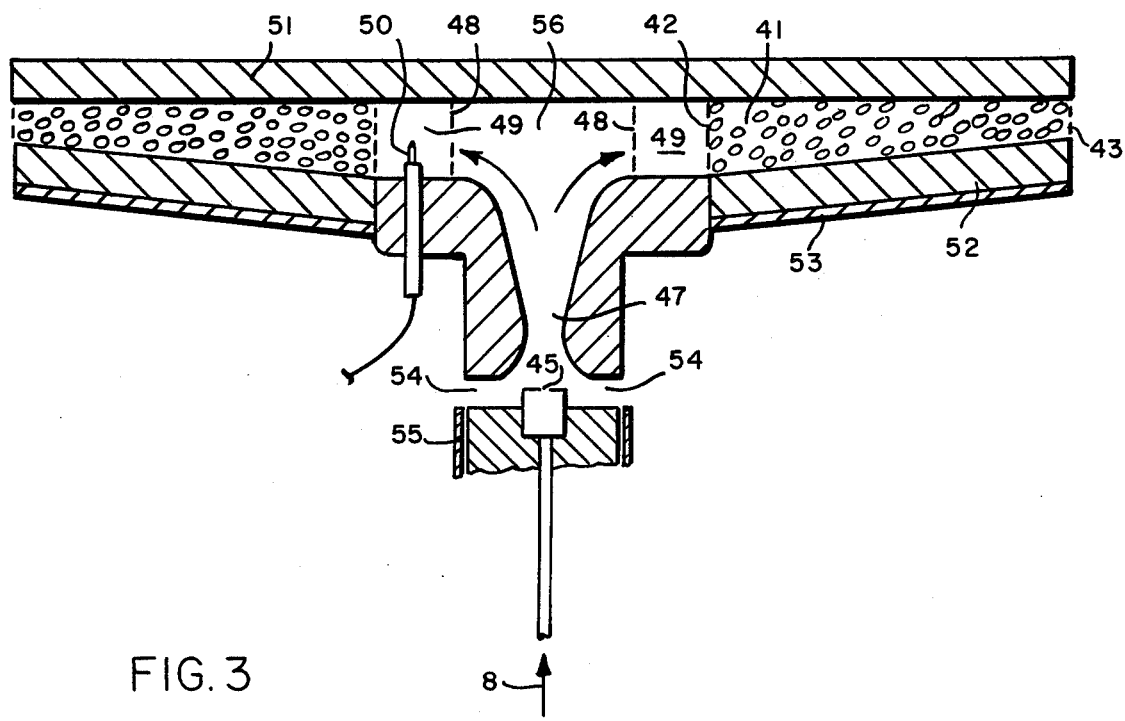
FIG. 3 is a cross sectional view of another embodiment of the invention. The flow path of the gasses is from the axis to the periphery of the catalyst bed.

FIG. 3 illustrates another catalytic stove configuration which can use our method of ignition. The catalyst bed 41 is annular in shape and is enclosed on the entrance side by ignition screen 42 and on the exit side by another screen or perforated metal band 43 to retain the catalyst pellets.

The fuel enters under pressure through conduit 8 and then issues through a high velocity jet from orifice 45. As the fuel passes through the throat of an aspirator 47, air enters through orifices 54 and becomes entrained in the stream. The combustible mixture passes from a plenum 56 through distribution screen 48 into ignition zone 49. A piezoelectric igniter 50 is disposed within ignition zone 49 and is sparked from the tip to a nearby grounded metallic element. In operation, when fuel and air flows into ignition zone 49 and the spark is formed, a flame will be produced and confined within the ignition zone 49 by distribution screen 48. The products of the flame combustion will flow through ignition screen 42 and into the catalyst bed. The heat will be transferred to the catalyst pellets 41 and heat them to about 350° F. or above at which point they will support flameless combustion. The flame is then extinguished by momentarily sliding sleeve 55 over orifices 54. When the sleeve is slipped back, the air will reenter the orifices 54 and in turn will flow into the catalyst bed 41. At that time, flameless combustion will begin on the surfaces of the catalyst pellets. The products of combustion will leave the burner through the screen 43 at the periphery of the burner.

The top surface 51 of the burner may be formed of a metallic plate of good thermal conductivity, and of sufficient thickness to distribute the heat fairly uniformly throughout the top, thus preventing distortion which could result from large temperature gradients. The combination of a flat burner top and a cooking utensil with a flat bottom minimizes the thickness of the air film between the stove top and the utensil, and enhances the conduction of heat into the utensil promoting efficient use of fuel.

The lower surface 53 which retains the catalyst bed can be formed of metal and thermal insulation. In this embodiment, thermal insulation 52 is shown in contact with the catalyst pellets, and a metal support 53 provides the outer construction. A suitable insulation is a felt formed from refractory fibers. Such felt provides a resilient cushion for the pellets and protects them from cracking as a result of forces generated by thermal expansion during heating.

A wide variety of gaseous and liquid fuels can be used in the present invention. Liquid fuels such as gasoline, kerosene and Number 1 fuel oil along with liquid hydrocarbon mixtures or individual hydrocarbons such as benzene have applicability. Gaseous fuels such as city gas, natural gas, methane, propane, and butane may be used. Also applicable are liquids such as the lower alcohols, for example methanol, ethanol, propanol, butanol and their isomers. In the case of the heavier hydrocarbons such as kerosene and the Number 1 fuel oil, the liquids are atomized upon their entrance into the plenum, and it is sometimes necessary to initially entrain a supplementary starting gas or liquid to aid in the formation of a flame in the ignition zone. Also an evaporator may be provided downstream to heat the fuels in the fuel conduit or the liquid can be atomized from a nozzle. Means for mixing the fuel and air such as turbulence vanes may be provided in the plenum in addition to or in substitution for the aspirator. The fuel can also be introduced tangentially into the plenum, whereby turbulence can be inherently provided.

The catalyst which we prefer to use in the burner constitutes at least a substantial portion of discrete material in the bed and in sufficient quantities to effect complete oxidation of the fuel therein without the production of a flame. Examples of oxidation catalysts for use with the invention include activated forms of metal oxides impregnated with a minor amount of a metal in finely divided form. In particular, activated forms of alumina, beryllia, thoria, zirconia or magnesia or mixtures of these oxides impregnated with minor amounts of finely divided metals such as platinum, palladium, rhodium, ruthenium, silver, copper, chromium, manganese, nickel, cobalt or combinations of these metals are especially suitable.

As is known in the art of catalysts, the so-called activated forms of these metal oxides, such as activated alumina, are those forms which are characterized by a porous structure which possesses a large internal pore volume and surface area. The activated form is prepared by controlled dehydration of a hydrated form of the oxide, control of temperature during the dehydration being essential to prevent destruction of the pore structure. Activated alumina, for example, may be prepared by precipitating a hydrous alumina gel from a solution of an aluminum salt, drying gel, and thereafter heating carefully at a temperature not higher than about 2000° F. to expel the hydrated water and produce a partially anhydrous or substantially anhydrous oxide often referred to as gamma alumina. Catalytically active alumina may also be prepared from the naturally occurring bauxite, which contains, hydrated alumina, by removal of the impurities which it contains, such as iron and silicates, following by heating at a temperature below about 2000° F. to drive off the hydrated water.

The amount of metal impregnating the activated oxide may vary considerably and the optimum amount depends to some extent upon the particular metal chosen. In the case of platinum or palladium, for example, very small amounts are required to produce an oxidation catalyst of excellent activity, such as from 0.01% to 1.0% by weight based on the weight of the activated metal oxide. In the case of other materials, such as a silverchromium combination, a somewhat higher percentage of the metal such as from 0.2% to 5.0% may be more desirable.

Impregnation of the active oxide may be accomplished by any desirable method which will result in the depositing of the metal upon the surface of the oxide in finely divided form. Impregnation is most conveniently accomplished by dipping the metal oxide, such as activated alumina, into a solution of a salt of the desired metal and then decomposing the salt. Thus for example, activated alumina may be dipped into a 1.0% by weight aqueous solution of chloroplatinic acid, dried, and then the platinum salt decomposed into metallic platinum by heat. As a result of this type of impregnation, the platinum is distributed over the surface of the alumina in extremely divided form.

While oxidation catalysts of the type described above are particularly suitable for use with the invention, it is to be understood that other types having similar activity and similar properties with respect to deactivation temperature may also be employed. In general, it may be stated that suitable oxidation catalysts for use in accordance with the invention should have the following characteristics: good activity, that is the ability to promote the oxidation of fuels at high rates per unit catalyst surface area; wide range of effective operating temperatures, that is, the ability to promote the oxidation of fuels at significant rates at relatively low operating temperatures, such as temperatures from 350° F. to 1000° F. coupled with the ability to operate at high temperatures, such as up to 1300° F. or 1800° F. without undergoing deactivation; and fairly good physical stability such as resistance to erosion, attrition or other types of disintegration.

It is apparent that modification and changes can be made within the spirit and scope of the present invention. It is our intention, however, only to be limited by the scope of appended claims.

We claim:

1. In the process for operating a gas burner, the steps which comprise:
   forming a combustible mixture of a fuel and a combustion supporting gas; flowing said mixture into the burner and thence into an annular ring forming an ignition zone; igniting said mixture in said ignition zone and forming a flame and confining the flame within the ignition zone; flowing the products of combustion from said ignition zone into a second annular ring disposed within said first annular ring, said second annular ring containing an oxidation catalyst, whereby the catalyst is heated to a temperature sufficient to support combustion thereon; extinguishing said flame by stopping the flow of fuel or the combustion supporting gas or both and then flowing said mixture over said catalyst to flamelessly combust said mixture and provide heat.

2. In the process for operating a gas burner, the steps which comprise:
   forming a combustible mixture of a fuel and a combustion supporting gas; flowing said mixture axially into the burner and thence into an annular ring forming an ignition zone; igniting said mixture in said ignition zone and forming a flame and confining the flame within the ignition zone; flowing the products of combustion from said ignition zone into a second annular ring disposed peripherally around said first annular ring, said second annular ring containing an oxidation catalyst, whereby the catalyst is heated to a temperature sufficient to support combustion thereon; extinguishing said flame by stopping the flow of fuel or the combustion supporting gas or both and then flowing said mixture over said catalyst to flamelessly combust said mixture and provide heat.

3. A burner for flameless catalytic combustion of fuels comprising:
an ignition zone;
a plenum disposed on one side of said ignition zone and a catalyst zone disposed on the other side of said ignition zone, said ignition zone being annularly disposed about the plenum and the catalyst zone being annularly disposed about the ignition zone;
ignition means disposed within the ignition zone and adapted to produce a flame within said ignition zone when activated;
a foraminous member on each side of said ignition zone, one of which is arranged to separate the ignition zone from the catalyst zone and the other of which is arranged to separate the plenum from the ignition zone;
means to admit a fuel into said plenum and means to introduce a combustion supporting gas into said plenum;
means to extinguish a flame in said ignition zone after it has been formed;
means to remove products of combustion from the burner.

4. A burner with flameless catalytic combustion of fuels comprising:
an ignition zone;
a plenum in communication with said ignition zone and a catalyst zone disposed within said ignition zone, said ignition zone being annularly disposed about the catalyst zone;
ignition means disposed within said ignition zone and adapted to produce a flame within said ignition zone when activated;
a foraminous member on an inlet and another on a outlet side of said ignition zone, one of which is arranged to separate the ignition zone from the catalyst zone and the other of which is arranged to separate the plenum from the ignition zone;
means to admit a fuel into said plenum and means to introduce a combustion supporting gas into said plenum;
means to extinguish the flame in said ignition zone after it has been formed.
means to remove the products of combustion from the burner.

5. The process according to claim 2 wherein the flame is contained within the ignition zone prior to flameless combustion by a pair of screens which form the ingress and egress of the zone.

6. The process according to claim 2 wherein the flame is initiated by producing a spark within the ignition zone.

7. The process according to claim 2 wherein the fuel is in the gaseous or liquid phase.

8. The burner according to claim 4 wherein the foraminous members are screens with openings between about 0.075 and 0.028 inches, and the screen disposed between the plenum and the ignition zone has sufficiently small openings to prevent the emergence of flame into the plenum.

9. The burner according to claim 4 further including mixing means and arranged to mix the fuel and combustion supporting gases prior to their introduction into the plenum.

10. The burner according to claim 4 wherein the ignition means is a piezoelectric arranged to generate a spark upon activation of a switch.

11. The burner according to claim 4 wherein the means to extinguish the flame is a sleeve arranged to be slipped over the means to introduce combustion supporting gas into the plenum.

12. The process according to claim 1 wherein the flame is contained within the ignition zone prior to flameless combustion by a pair of screens which form the ingress and egress of the zone.

13. The process according to claim 1 wherein the flame in initiated by producing a spark within the ignition zone.

14. The process according to claim 1 wherein the fuel is in the gaseous or liquid phase.

15. The burner according to claim 3 wherein the foraminous members are screens with openings between about 0.075 and 0.028 inches, and the screen disposed between the plenum and the ignition zone has sufficiently small openings to prevent the emergence of flame into the plenum.

16. The burner according to claim 3 further including mixing means and arranged to mix the fuel and combustion supporting gases prior to their introduction into the plenum.

17. The burner according to claim 3 wherein the ignition means is a piezoelectrode arranged to generate a spark upon activation.

18. The burner according to claim 3 wherein the means to extinguish the flame is a sleeve arrange to be slipped over the means to introduce combustion supporting gas into the plenum.

* * * * *